Jan. 7, 1958  T. A. MILLER ET AL  2,818,604
BLEEDER PASSAGE MOLD FOR FORMING HOLLOW PLASTIC ARTICLES
Filed Jan. 7, 1955
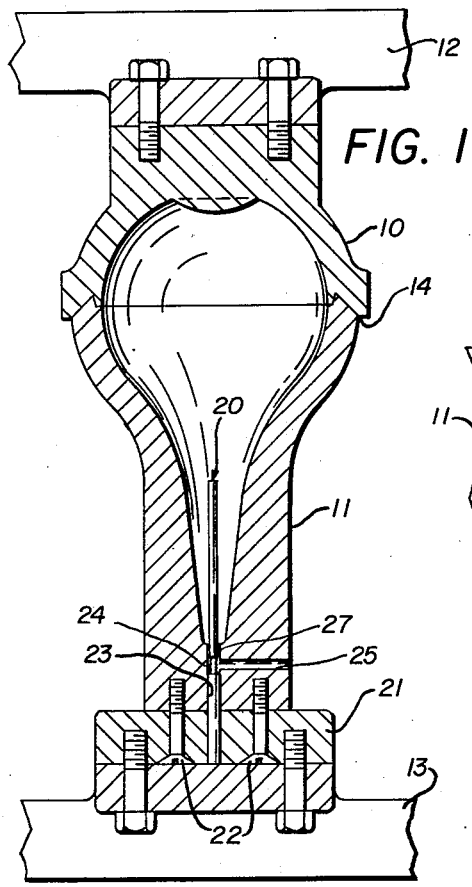
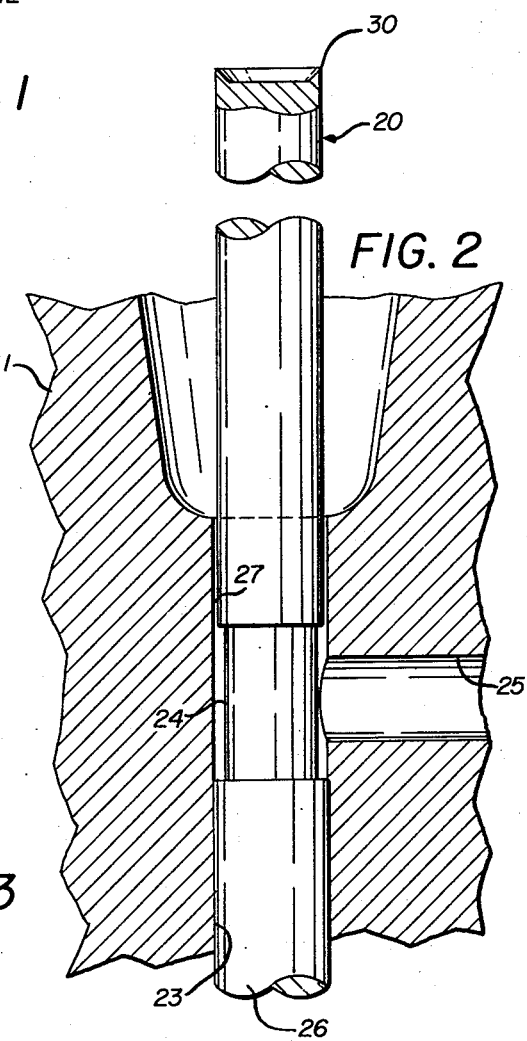
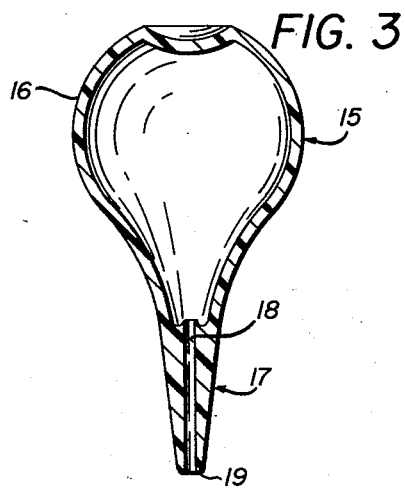
INVENTORS
THEODORE A. MILLER &
THEODORE A. MILLER JR.
BY
Oldham & Oldham
ATTORNEYS

United States Patent Office 2,818,604
Patented Jan. 7, 1958

2,818,604

BLEEDER PASSAGE MOLD FOR FORMING HOLLOW PLASTIC ARTICLES

Theodore A. Miller and Theodore A. Miller, Jr., Cuyahoga Falls, Ohio

Application January 7, 1955, Serial No. 480,367

2 Claims. (Cl. 18—39)

This invention relates to molds for forming hollow plastic articles without pressure from a solution or dispersion of thermo-setting plastic material, commonly known as plastisol, and is particularly directed to such molds having means for bleeding air therefrom during the article-forming process. The invention is especially useful where the hollow article is to be formed with a narrow extensive tubular neck portion extending from a bulbous body.

In the manufacture of hollow plastic articles from a solution or dispersion of thermo-setting plastic material, commonly known as plastisol, hollow molds, usually of two-part construction, are assembled after placing of a quantity of plastisol therebetween, and are then rotated about a plurality of axes while being subjected first to heating and later to cooling to gel and thermoset and plastisol about the interior of the molds, without application of pressure.

While even distribution of the plastic material over the interior surface of a simple mold such as a spherical mold for forming a hollow ball by such method has been successfully accomplished, the production of articles of more complicated shapes has involved greater difficulties, especially where the desired article had a relatively thin member extending from a thicker, more bulbous body, as air entrapped in the more narrow passage for forming the thin member resulted in imperfect and porous deposit in such passage. Ordinary methods of removing the entrapped air, such as the provision of drilled vent holes in the thin passage of the mold, failed to produce satisfactory results as the plastisol escaped freely through such holes even when the holes were formed with a number eighty drill having a diameter of .0135 inch, while, at the same time, bleeding of air from the mold was not satisfactory, resulting in excessive loss of plastic from the mold and production of imperfect articles.

It is an object of this invention to overcome the foregoing and other difficulties and to provide for bleeding the air from the mold without excessive loss of plastisol.

Another object is to bleed the air from the mold without the production of objectionable mold rinds or other surface blemishes on the article.

These and other objects will appear from the following description and the accompanying drawings.

Of the drawings:

Fig. 1 is a longitudinal sectional view of a mold for forming an ear and ulcer syringe, constructed in accordance with and embodying the invention, a portion of the mold-supporting members being shown, other portions being broken away.

Fig. 2 is an enlarged detail view thereof showing the core pin and a portion of the mold thereabout defining the bleeder passage therebetween.

Fig. 3 is a longitudinal sectional view of the article produced by the mold.

Referring to the drawings, the numerals 10 and 11 designate, respectively, the mating mold cavity members of a mold for forming an ear and ulcer syringe, the cavity members being mounted, respectively, on mold support members 12, 13 and meeting upon a parting line 14. The syringe 15 is illustrated in Fig. 3 and comprises a bulbous hollow body 16 having a substantially uniform wall thickness, and a tubular member 17 extending therefrom, the tubular member having a uniform bore 18 surrounded by a wall diminishing in thickness outwardly of the bulbous body with its terminal portion 19 rounded.

To provide the bore 18 of the article, a core pin 20 is mounted on a plate 21 secured to mold cavity member 11 by screws 22, and extends into the mold cavity through an axial bore 23 of the cavity member 11. The core pin extends slightly past the shoulder of the article at the end of the desired bore 18, and has a cupped self-trimming end with a sharp edge 30. When a measured quantity of plastisol is placed in the mold cavity, the mold closed and then rotated in a heated over, the plastisol will coat and gel upon the mold surfaces forming a uniform coating over the interior of the bulbous portion and flowing into the space between the mold cavity and the core pin. The material will barely form a film over the cupped end of the core pin.

For providing for bleeding of air from the neck of the mold cavity without substantial loss of plastisol, the core pin 20 is formed with a necked portion 24 spaced axially from the mold cavity and communicating with a side aperture 25 leading to the atmosphere. The anchored portion 26 of the core pin is made a light press fit in the bore 23 of the cavity member for centering the pin therein, whereas the diameter of the pin 20 within the mold cavity and extending to the necked portion 24 is made .002 inch less than the bore 23, to provide an annular space 27 therebetween having a radial thickness of .001 inch or less. The space at the necked portion 24 is made considerably greater, for example, about .010 inch less than the bore 23. In other words, if the base of the mold pin 20 is of diameter D, the upper portion of the pin should be made D–.002 inch diameter, and the necked portion 24 should be made about D–.010 inch in diameter. The opening 25 may be made about the same diameter as the bore 23.

In use of the apparatus, the air bleeds off through the thin annular space 27 with merely a small rind or fin of the plastic material slightly extending into the space 27, and the neck portion 17 of the article is free from entrapped air. Experiments have shown that where the opening 23 is made .123 inch, very little escape of plastisol into the spaces iccurs, whereas with a vent hole made by a number eighty drill having a diameter of .0135 inch, excessive escapes of plastisol occur and venting is unsatisfactory, although with a pin of such dimensions, the area about the pin is .0003927 square inch, as compared to the area .0001431 of the .0135 hole.

While applicants are unable to explain all of the reasons why the annular space 27 of .001 or less thickness bleeds off the air without substantial flow of the liquid plastic therethrough, whereas a round vent hole of not over .0135 inch diameter has been found unsatisfactory for the purpose, it is believed that while the total area of the space of .001 inch thickness exceeds the area of a hole of diameter .0135 inch, the resistance to flow of the plastic material through the narrow space is relatively higher than that through the hole. For example, if the plastisol may be considered as a dispersion of round plastic particles which could not pass through a passage .001 inch or less in width, such particles might well pass through a hole having a diameter of .0135 inch. Another possible factor is that surface tension might prevent the passage of the liquid material through a .001 inch space, but might permit passage through an opening .0135 inch in diameter.

Whatever the underlying scientific reason may be, the thin annular space has produced more satisfactory results in use than other methods of venting. It provides adequate escape of entrapped air with minimum escape of plastisol.

Variations may be made without department from the scope of the invention as it is defined by the following claims.

We claim:

1. A mold for forming a hollow bulb having a substantially spherical hollow body and a long tubular neck portion providing the only aperture thereto by deposit, gelling, and thermosetting of a liquid dispersion of thermosetting material, said mold comprising a mold member having a substantially hemispherical cavity, a complementary mold member having a deep cavity with a conical portion merging into a substantially hemispherical portion at the meeting plane of the mold members, said conical portion terminating in a cylindrical bore of small diameter, a cylindrical pin having an axially inner end smaller in diameter than said bore and extending axially through the conical portion of said complementary mold member to a position beyond the path of flow of the liquid dispersion, the space between said pin and said bore providing a vent passage for venting air from the conical portion of the cavity, said pin having an axially outer end of greater diameter than the axially inner end thereof engaging the wall of said cylindrical bore to center said pin in said bore, and a vent to the atmosphere in said complementary mold member connecting with said vent passage.

2. A mold as defined by claim 1 in which said pin has a neck of reduced diameter at a portion thereof axially outwardly of the mold cavity and said vent to the atmosphere connects with the space provided at said neck.

References Cited in the file of this patent

UNITED STATES PATENTS

| | | |
|---|---|---|
| 1,745,482 | Goodwin | Feb. 4, 1930 |
| 2,266,831 | Tegarty | Dec. 23, 1941 |
| 2,321,319 | Rempel | June 8, 1943 |
| 2,340,278 | Sudman | Jan. 25, 1944 |
| 2,406,589 | Cunningham | Aug. 27, 1946 |
| 2,469,892 | Rempel | May 10, 1949 |
| 2,573,693 | De Bell | Nov. 6, 1951 |